(12) United States Patent
Roychoudhury

(10) Patent No.: US 9,340,129 B2
(45) Date of Patent: May 17, 2016

(54) DIFFERENTIAL LATERAL STIFFNESS ARMREST

(71) Applicant: FORD GLOBAL TECHNOLOGIES, LLC, Dearborn, MI (US)

(72) Inventor: Raj S. Roychoudhury, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 47 days.

(21) Appl. No.: 14/507,023

(22) Filed: Oct. 6, 2014

(65) Prior Publication Data

US 2016/0096454 A1    Apr. 7, 2016

(51) Int. Cl.
 *B60N 2/42* (2006.01)
 *B60N 2/427* (2006.01)
 *B60N 2/46* (2006.01)

(52) U.S. Cl.
 CPC .......... *B60N 2/42727* (2013.01); *B60N 2/4235* (2013.01); *B60N 2/46* (2013.01)

(58) Field of Classification Search
 CPC .............................. B60N 2/4235; B60N 2/427
 USPC ...................... 297/216.1, 487, 488
 See application file for complete search history.

(56) References Cited

U.S. PATENT DOCUMENTS

| | | | | |
|---|---|---|---|---|
| 4,270,798 A * | 6/1981 | Harder, Jr. | ............ | A47C 7/543 297/411.31 |
| 4,568,122 A * | 2/1986 | Kain | ............ | B60N 2/2866 297/216.11 |
| 4,662,683 A * | 5/1987 | Knoedler | ............ | B60N 2/286 297/487 |
| 5,290,087 A | 3/1994 | Spykerman | | |
| 5,425,568 A | 6/1995 | Sliney et al. | | |
| 5,447,356 A * | 9/1995 | Snijders | ............ | A47C 7/405 297/284.3 |
| 6,045,183 A * | 4/2000 | Weber | ............ | B60N 2/286 297/173 |
| 6,361,118 B1 * | 3/2002 | Melgarejo | ............ | A61G 5/12 16/324 |
| 7,134,721 B2 * | 11/2006 | Robinson | ............ | B60N 2/501 297/284.11 |
| 7,156,459 B2 * | 1/2007 | Ambasz | ............ | A47C 1/03 297/126 |
| 7,195,312 B2 | 3/2007 | Crossman et al. | | |
| 7,416,257 B1 * | 8/2008 | Lakhman | ............ | C07D 471/04 297/230.1 |
| 7,862,123 B2 * | 1/2011 | Baker | ............ | A47C 7/54 297/115 |
| 7,934,771 B2 | 5/2011 | Tamakoshi et al. | | |
| 8,172,311 B2 | 5/2012 | Hughes, Jr. et al. | | |
| 2011/0254340 A1 * | 10/2011 | Hsuan-Chin | ............ | A47C 1/03 297/411.31 |

FOREIGN PATENT DOCUMENTS

JP    07194462    8/1995

* cited by examiner

*Primary Examiner* — Timothy J Brindley

(74) *Attorney, Agent, or Firm* — Vichit Chea

(57) ABSTRACT

An automobile armrest is described. The armrest allows lateral movement in an outboard direction while resisting inboard movement. The armrest facilitates occupant egress and mitigates injury in a collision. Lateral outboard movement of the armrest is non-destructive and the armrest returns to a standard position upon removal of the outboard force.

20 Claims, 4 Drawing Sheets

DIFFERENTIAL LATERAL STIFFNESS ARMREST

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle occupant safety, and, more specifically to occupant seating structures to mitigate injury due to automobile collision and facilitate passenger egress.

A common type of vehicle seating in an automobile is a captain chair seat with armrests. The armrests support the elbow, forearm, and hand of a seated passenger. Armrests are commonly attached to the backrest portion of the seat and pivot upward to a position where the armrest is flush with the seat back. This pivoted position permits lateral movement of a passenger past a seat boundary and also permits the seat back to fold forward to a collapsed position. In addition to providing comfort, armrests are relevant to vehicle safety.

In a side-impact collision, injury to occupants may be sustained when an occupant strikes portions of the vehicle interior with high impact force. Side impact crashes account for more than a quarter of all fatal motor vehicle crashes, second only to head-on collisions. In non-fatal crashes, serious thoracic or abdominal injury, such as contusions, internal tearing, organ rupture, and fractured ribs, may result from rapid deceleration and impact with interior features, such as armrests.

Armrest padding has been used to mitigate injury risk. Other armrest safety modifications are known in the art, including armrests that break away in an impact and armrests that deform upon impact. However, there remains a need to further mitigate occupant injury risk due to armrest impact during collisions.

SUMMARY OF THE INVENTION

In one aspect of the invention, an armrest assembly is provided that has sufficient strength and rigidity to withstand the loads applied during everyday use and is capable of decreasing the risk or severity of injury to an occupant during a side impact event in which the vehicle occupant forcefully impacts the armrest.

Another aspect of the present invention is to provide an armrest assembly having decreased resistance to outboard force, configured to non-destructively move in an outboard direction and then return to a standard position following removal of the outboard force.

Another aspect of the present invention is to provide an armrest assembly that is cost effective to manufacture and comfortable to use.

In accordance with the foregoing aspects of the invention, an armrest assembly is provided having an armrest defining a mounting recess on an outboard side of the armrest; a spring positioned in the mounting recess; and a mounting pin configured to affix the armrest and spring to a seat back through the mounting recess, and wherein the armrest is adapted to respond to an outboard force by non-destructively angling outward from a standard position and returning to the standard position upon removal of the force.

DETAILED DESCRIPTION OF PREFERRED EMBODIMENTS

In order to facilitate occupant egress and mitigate injury in a collision, an armrest is described which allows lateral movement in an outboard direction while resisting inboard movement.

Figure 1:
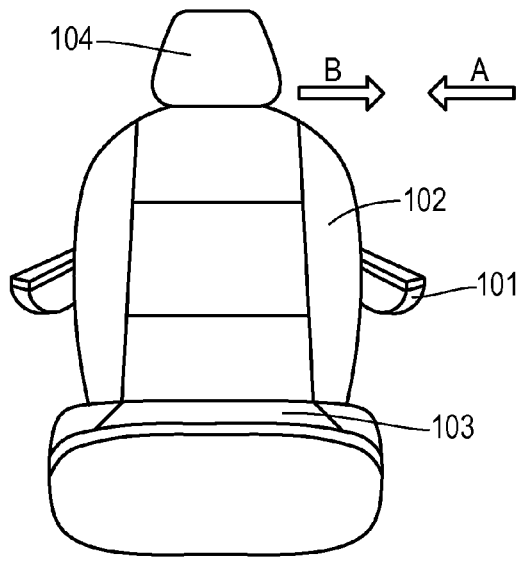
FIG. 1 is a front view of a seat assembly.
Figure 2:
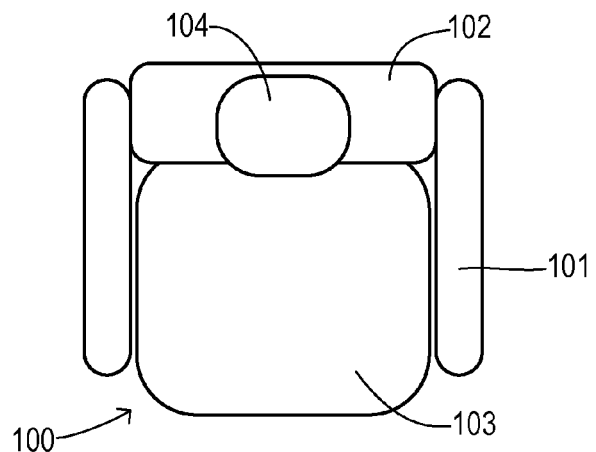
FIG. 2 is a top view of a seat assembly.

As shown in FIGS. 1-2, many seat assemblies 100 in automobiles have a seat cushion 103, a head rest 104, a seat back 102 and an armrest 101 attached to the seat back 102 to provide a surface on which the vehicle occupant may rest their elbow, forearm, or hand. These captain seat type armrests 101 are typically connected to the seat back 102 by a fastening bolt or mounting pin. The armrest rotates up and down about the pin such that the armrest can pivot in an arc with respect to the seat back between a lowered, use position, and a raised, stored position. Vehicle armrests do not typically provide lateral movement of the armrest.

Lateral forces arise in side-impact collisions. During a collision there is inboard lateral force towards a vehicle occupant, shown by arrow A in FIG. 1. There may also be outboard lateral force, shown by arrow B in FIG. 1, as rapid changes in velocity thrust the occupant against the interior cabin space. These outboard forces can cause an occupant to impact the armrest. Outboard forces are outward from the perspective of the seated occupant and may include both movement towards the exterior of the vehicle and movement towards the center of the vehicle. Likewise, inboard forces are relative to the seated occupant.

To reduce injury, it is helpful if the inboard lateral armrest stiffness is high, such that it can resist intrusion of objects into the occupant space and reduce bodily harm. In contrast, it is helpful if the outboard lateral armrest stiffness is low. This is because, if the occupant is pushed outboard, then the armrest can yield and be compliant.

Figure 3:
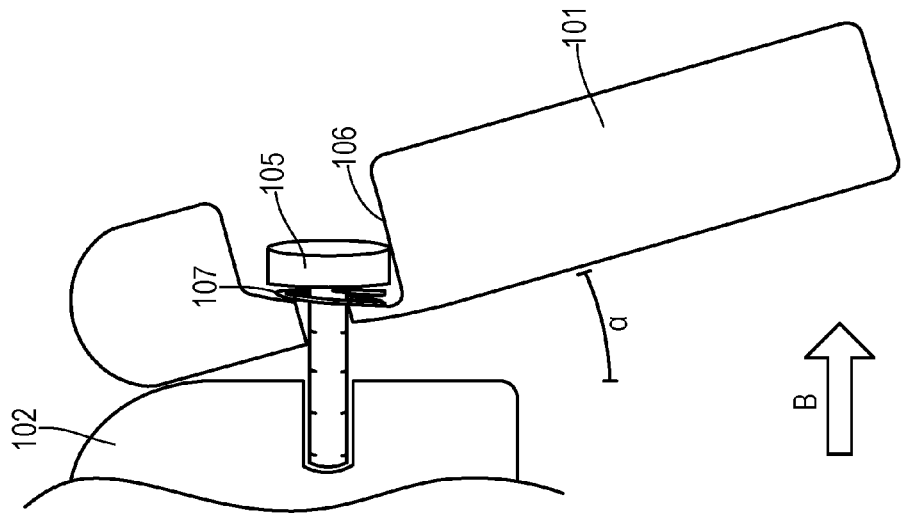
FIG. 3 is a top view cross section of an armrest showing one embodiment of the present invention.

FIG. 3 illustrates an embodiment of an armrest in its in-use position showing a design where the outboard lateral stiffness is lower than the inboard stiffness. A mounting pin 105 attaches an armrest 101 to a seat back 102. The armrest 101, shown in cross section, has a mounting recess 106. A spring 107 is positioned in the mounting recess 106 and held in place by the mounting pin 105. The mounting recess 106 in the embodiment shown in FIG. 3 is asymmetrical with the recess deeper on the side towards the front of the seat assembly 100. The outboard lateral armrest stiffness is reduced from the inboard stiffness by the use of the spring 107 with the asymmetrical mounting recess 106. Testing has validated the effectiveness of the design to provide reduced lateral stiffness in the outboard direction without decreasing lateral stiffness in the inboard direction.

Figure 4:
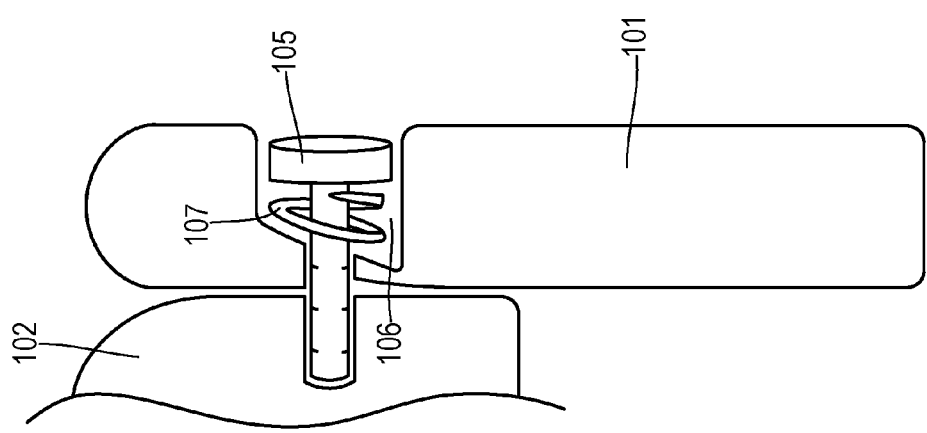
FIG. 4 is a top view cross section of an armrest showing the embodiment of FIG. 3 with the spring compressed by an outboard force.

FIG. 4 shows a cross section top view of the armrest of FIG. 3 in a collision position. An outboard force, shown by arrow B, pushes the armrest 101 and compresses the spring 107. The angle of outward deflection is shown by angle α.

The mounting recess 106 depicted in FIG. 4 is a substantially cylindrically shaped inset that is asymmetrically shallower in the rearward portion and deeper at the forward edge, with an angled, substantially flat, surface on the inward face of the mounting recess 106.

FIGS. 5-8 show non-limiting examples of springs 107 for use in a mounting recess 106. The shape and configuration of the mounting recess 106 can be modified to accommodate different spring 107 shapes and different mounting pins 105. In some embodiments the mounting recess 106 and/or the spring 107 is shaped to align the spring in the mounting recess and thereby ensure that the armrest 101 moves more easily in the outboard direction. The shaping may include: notches, grooves, depressions, slots, squared corners, and the like.

In some embodiments the mounting pin 105 may be formed of a plurality of parts, such as a bolt shaft that is assembled with a securing head and screw. A trim piece, such as a snap-on paneling pad, can cover an exterior mounting point to create a desired appearance and cover any gaps or to cover the head of the mounting pin 105.

Figure 5:
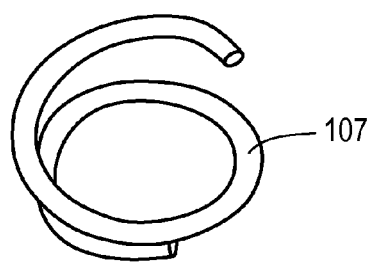
FIG. 5 is a perspective view of a coiled wire spring for use with embodiments of the present invention.

FIG. 5 shows a cylindrical wire spring. When placed in a mounting recess 106, the mounting pin 105 could pass along the spring axis through the central void in the coils of the spring 107.

Spring characteristics can be modified to fit the performance requirements. For example, the material and construction may be adapted to change the force needed to compress the coils of the spring. The spring constant may be linear, progressive, or degressive; it may have an inflection point such that the spring constant changes with the degree of deflection.

Figure 6:
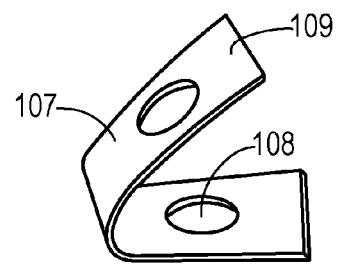
FIG. 6 is a perspective view of a plate spring for use with embodiments of the present invention.

FIG. 6 shows a plate spring. When placed in the mounting recess 106, the mounting pin 105 would pass through the two apertures 108. Other plate spring configurations may be used. For example the plate spring may omit the aperture 108 and may instead have legs 109 that are forked with the mounting pin 105 fit in the fork. The plate spring may fit into the mounting recess 106 adjacent the mounting pin 105 without the use of an aperture or forked segment. The ends of the legs 109 may be shaped to fit the mounting recess 106 and permit unobstructed movement.

Figure 7:
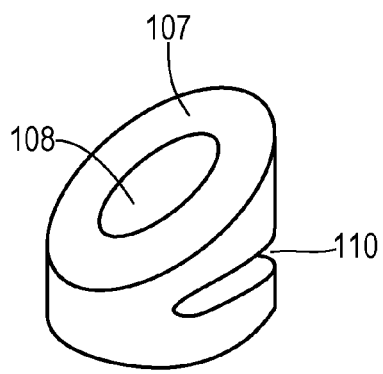
FIG. 7 is a perspective view of an angled machined spring for use with embodiments of the present invention.

FIG. 7 shows an asymmetric machined spring. The spring 107 shown in FIG. 7 is asymmetric in both its overall shape and in its compression profile. The angled face of the cylindrical tube-shaped spring is configured to seat against the inward face of the mounting recess 106 opposite the head of the mounting pin 105. The shaft of the mounting pin 105 is configured to pass through the aperture 108. The slot 110 size, shape, and number of slots can be varied to achieve desired spring characteristics such as specific compression stiffness.

Figure 8:
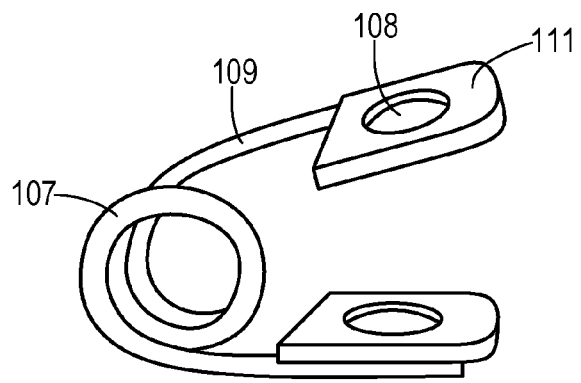
FIG. 8 is a perspective view of a torque spring for use with embodiments of the present invention.

FIG. 8 shows a helical cylindrical torsion spring. The spring 107 has legs 109 which are each attached to a platform 111 having an aperture 108. The shaft of the mounting pin 105 is configured to pass through the aperture 108. The platform 111 of one leg 109 is configured to abut the inner side of the head of the mounting pin 105. The platform 111 of the other leg is configured to seat against the inward surface of the mounting recess 106, opposite the head of the mounting pin 105.

Figure 9:
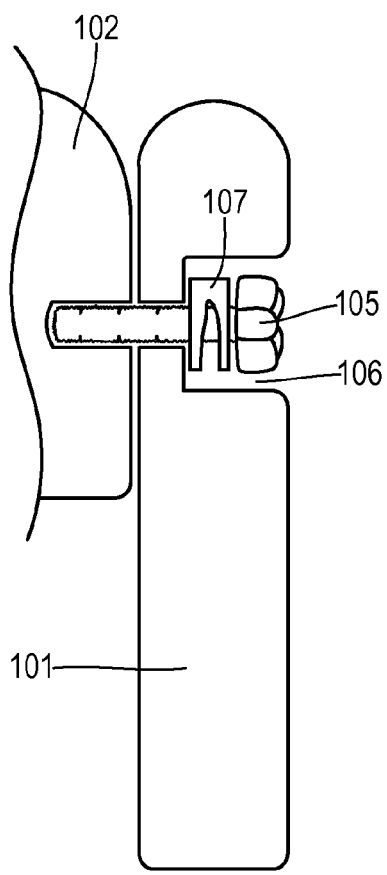
FIG. 9 is a top view cross section of an armrest showing another embodiment of the present invention.

FIG. 9 illustrates another embodiment of an armrest showing a design where the outboard lateral stiffness is lower than the inboard stiffness. A mounting pin 105 attaches an armrest 101 to a seat back 102. The armrest 101, shown in cross section, has a mounting recess 106. A spring 107 is positioned in the mounting recess 106 and held in place by the mounting pin 105. The mounting recess 106 in the embodiment shown in FIG. 8 is substantially symmetrical with a substantially uniform recess depth. The outboard lateral armrest stiffness is reduced from the inboard stiffness by the use of the spring 107 with a generally symmetric shape and asymmetric compression characteristics.

Figure 10:
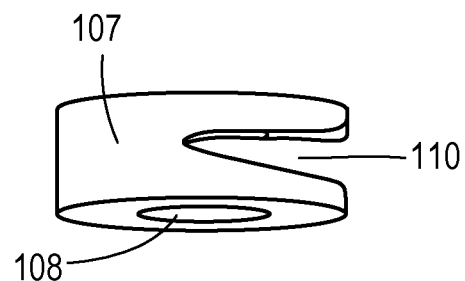
FIG. 10 is a perspective view of a machined spring for use with embodiments of the present invention.

FIG. 10 shows an example of a machined spring suitable for use in the embodiment shown in FIG. 9. The spring 107 shown in FIG. 10 has an asymmetric compression profile. One end of the cylindrical tube-shaped spring is configured to be adjacent the inward face of the mounting recess 106. The other end of the cylindrical tube-shaped spring is configured to be adjacent the inner face of the head of the mounting pin 105. The shaft of the mounting pin 105 is configured to pass through the aperture 108. The slot 110 size, shape, and number of slots can be varied to achieve desired spring characteristics such as compression stiffness and to control the nondestructive lateral movement range of the armrest 101. The shape of the mounting pin 105 and spring aperture 108, or mounting recess and spring 107 can be adapted to mate and ensure proper placement of the spring so that the outboard lateral stiffness is greater than the inboard lateral stiffness.

Figure 11:
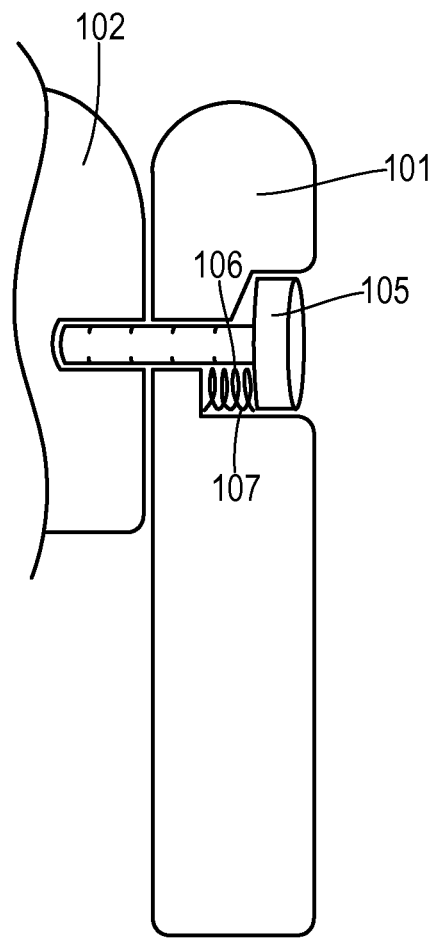
FIG. 11 is a top view cross section of an armrest showing another embodiment of the present invention.

FIG. 11 illustrates another embodiment of an armrest showing a design where the outboard lateral stiffness is lower than the inboard stiffness. A mounting pin 105 attaches an armrest 101 to a seat back 102. The armrest 101, shown in cross section, has a mounting recess 106. A spring 107 is positioned in the mounting recess 106 adjacent the mounting pin 105. The mounting pin 105 has a head on an outboard end, a shaft, and a fastening tip on the seat back end. A bearing end of the spring 107 abuts a part of the underside of the head of the mounting pin 105. The opposite bearing end of the spring 107 abuts an inner surface of the mounting recess 106.

In the preferred embodiments of the invention, the compression of the spring is sufficient to provide stiffness of the armrest to resist outboard force typical under everyday use. The armrest is stable and does not move laterally when gently leaned upon. In some embodiments the spring is pre-loaded with some compression in the use position for added lateral firmness.

In some embodiments there is a lower threshold force below which the armrest will not be deflected laterally. Under greater outboard force, such as in a side-impact collision, the spring is compressed and the armrest moves away from the occupant space. When the force is removed, the spring returns to its original position, thereby moving the armrest back to its in-use position without damage.

The configuration of the described design has minimal or no effect on the inboard stiffness resisting lateral force. Additional design elements may be combined with the described design to increase resistance to inboard force.

In some embodiments the typical loads to deflect the armrest are:
  Inboard to the seat: Loads greater than 500 N (~50 Kg).
  Outboard to the seat: About 250 N (~25 Kg).

Hence, the design cuts the load into half and may reduce occupant harm.

In some embodiments the armrest moves non-destructively in response to an outboard force in the range of: 100-1000 N, 200-700 N, 200-500 N, 250-500 N, or about 250 N. Within the specified range for the particular embodiment, the armrest springs back when the load is removed.

The angle of deflection a of the armrest is determined by the shape of the mounting recess and the load characteristics of the spring. In some embodiments, the armrest moves about 45 degrees outboard relative to the seat and to the standard in-use position of the armrest. In some embodiments the armrest moves non-destructively in response to an outboard force by moving non-destructively to up to: 1-90 degrees, 15-90 degrees, 15-75 degrees, 15-60 degrees, 1-45 degrees, 30-60 degrees, 30-45 degrees, or about 45 degrees.

Methods of reducing injury severity and risk are provided by an armrest assembly having a spring mounted in an armrest mounting recess, wherein the armrest assembly is adapted to respond to an outboard force by compressing the spring and thereby non-destructively angling the armrest outward from a standard position, in an outboard direction, and returning the armrest to the standard position upon removal of is the outboard force.

Injury caused in a side impact collision may be quantified. Established metrics include the "Side Impact Crashworthiness Evaluation Guidelines for Rating Injury Measures (Version III)," published May, 2014 by the Insurance Institute for Highway Safety; and the "Injury Criteria for Side Impact Dummies," by Shashi Kuppa, published May, 2004, by the United States National Highway Transportation and Safety Administration (NHTSA). The measures for assessing and calculating collision injury provided in these documents are incorporated by reference herein.

Rib deflection can be used to predict bone fracture and viscous criterion approximates soft tissue damage. As provided in the "Side Impact Crashworthiness Evaluation Guidelines for Rating Injury Measures," viscous criterion can be calculated using the formula:

$$VC(t)i = 1.0 * V(t)i * D(t)i / 138 \text{ mm}$$

where:

$V(t)i$ = the velocity of rib i at time t in m/s, and $D(t)i$ = the deflection of rib i at time t measured with a linear potentiometer.

The capacity of the described embodiments of the invention to absorb impact force acts to both slow and reduce the impact of the armrest on a vehicle occupant, thereby reducing the risk of injury. Furthermore an occupant is less likely to be trapped in the vehicle after a crash because, in many embodiments, the armrest can be moved away from the occupant by the crash victim themselves or by rescue personnel, using normal human strength, without the use of tools or equipment.

In some embodiments, the armrest assembly improves safety such that, in side impact safety testing the vehicle with a crash test dummy, a measured rib deflection of the dummy impacting the safety armrest is 5 mm to 20 mm less than a measured rib deflection of the dummy impacting a standard armrest.

In some embodiments, the armrest assembly improves safety such that, in side impact safety testing the vehicle with a crash test dummy, a measured rib deflection rate of the dummy impacting the safety armrest is 0.20 to 1.20 m/s less than a measured rib deflection rate of the dummy impacting a standard armrest.

In some embodiments, the armrest assembly improves safety such that, in side impact safety testing the vehicle with a crash test dummy, a measured viscous criterion of the dummy impacting the safety armrest is 0.10 to 0.40 m/s less than a measured viscous criterion of the dummy impacting a standard armrest.

In particular installations and embodiments, the structures of the armrest assembly may be formed of steel, copper, aluminum, metal alloys, plastic, composites, or other materials. The structure may be adapted by means known in the art, such as with the use of brackets, braces, notches, positioning grooves, levers, washers, gaskets, ratchet mechanisms, detent mechanisms, and the like. The structures may be adapted with padding, bolsters, reinforcement, texturing, and additional features.

The terms and expressions which have been employed are used as terms of description and not of limitation. Whenever a range is given in the specification, all intermediate ranges and subranges, as well as all individual values included in the ranges given are intended to be included in the disclosure. It should be understood that, although the present invention has been specifically disclosed by particular embodiments and examples, optional features, modification and variation of the concepts herein disclosed may be used by those skilled in the art, and such modifications and variations are considered to be within the scope of the invention as defined by the appended claims.

What is claimed is:

1. A vehicle armrest assembly, comprising:
   an armrest defining a mounting recess on an outboard side of the armrest;
   a spring positioned in the mounting recess; and
   a mounting pin configured to affix the armrest and spring to a seat back through the mounting recess, wherein the mounting pin has a shaft that passes through an aperture of the spring, and wherein the armrest is adapted to respond to an outboard force by non-destructively moving outward from a standard position and return to the standard position upon removal of the force.

2. The vehicle armrest assembly of claim 1, wherein the mounting recess is a substantially cylindrically shaped inset that is asymmetrically shallower in the rearward portion and deeper at the forward edge, forming an angled, substantially flat, inner surface, and wherein a bearing end of the spring abuts the inner surface.

3. The vehicle armrest assembly of claim 1, wherein the mounting pin has a head on an outboard end and a fastening tip on the seat back end, and wherein a bearing end of the spring abuts an underside of the head.

4. The vehicle armrest assembly of claim 1, wherein the mounting pin has a shaft that passes through a coil of a helical wire spring.

5. The vehicle armrest assembly of claim 1, wherein a threshold outboard force is needed to move the armrest, and wherein the threshold force is between 200-500 N.

6. The vehicle armrest assembly of claim 1, wherein the armrest is configured to non-destructively move up to 60 degrees in the outboard direction.

7. The vehicle armrest assembly of claim 1, wherein the armrest is configured to non-destructively move up to 45 degrees in the outboard direction.

8. The vehicle armrest assembly of claim 1, wherein the spring is a compression spring.

9. The vehicle armrest assembly of claim 1, wherein the force required to move the armrest in an outboard direction is less than half the force required to move the armrest in an inboard direction.

10. A method of supporting a pivotable armrest from a seat back in a vehicle, comprising:
providing an armrest body with a mounting recess;
inserting a spring and mounting pin into the mounting recess;
fastening the mounting pin to the seat back, wherein the mounting pin has a head on an outboard end and a fastening tip on the seat back end, and wherein a bearing end of the spring abuts an underside of the head;
whereby an outboard force on the armrest body compresses the spring, non-destructively angling the armrest body outward, from a standard position, and returning the armrest to the standard position upon removal of the force.

11. A vehicle armrest assembly, comprising:
an armrest defining a mounting recess on an outboard side of the armrest;
a spring positioned in the mounting recess; and
a mounting pin configured to affix the armrest and spring to a seat back through the mounting recess, wherein the mounting pin has a head on an outboard end and a fastening tip on the seat back end, and wherein a bearing end of the spring abuts an underside of the head, and wherein the armrest is adapted to respond to an outboard force by non-destructively moving outward from a standard position and return to the standard position upon removal of the force.

12. The vehicle armrest assembly of claim 11, wherein the mounting recess is a substantially cylindrically shaped inset that is asymmetrically shallower in the rearward portion and deeper at the forward edge, forming an angled, substantially flat, inner surface, and wherein a bearing end of the spring abuts the inner surface.

13. The vehicle armrest assembly of claim 11, wherein the mounting pin has a shaft that passes through a coil of a helical wire spring.

14. The vehicle armrest assembly of claim 11, wherein the mounting pin has a shaft that passes through an aperture of the spring.

15. The vehicle armrest assembly of claim 11, wherein a threshold outboard force is needed to move the armrest, and wherein the threshold force is between 200-500 N.

16. The vehicle armrest assembly of claim 11, wherein the armrest is configured to non-destructively move up to 60 degrees in the outboard direction.

17. The vehicle armrest assembly of claim 11, wherein the armrest is configured to non-destructively move up to 45 degrees in the outboard direction.

18. The vehicle armrest assembly of claim 11, wherein the spring is a compression spring.

19. The vehicle armrest assembly of claim 11, wherein the force required to move the armrest in an outboard direction is less than half the force required to move the armrest in an inboard direction.

20. A method of supporting an armrest from a vehicle seat back, comprising:
providing a mounting recess in an armrest;
inserting a spring and mounting pin into the mounting recess;
fastening the mounting pin through an aperture of the spring to the seat back;
whereby an outboard force on the armrest compresses the spring, non-destructively angling the armrest outward, from a standard position, and spring decompression returns the armrest to the standard position upon force removal.

* * * * *